(12) United States Patent
Inouye

(10) Patent No.: US 7,996,269 B2
(45) Date of Patent: Aug. 9, 2011

(54) USING MOBILE PHONES TO PROVIDE ACCESS CONTROL AND USAGE FEE CHARGES FOR MFDS

(75) Inventor: Steven H. Inouye, Cypress, CA (US)

(73) Assignee: Xerox Corporation, Norwalk, CT (US)

(*) Notice: Subject to any disclaimer, the term of this patent is extended or adjusted under 35 U.S.C. 154(b) by 1245 days.

(21) Appl. No.: 11/158,390

(22) Filed: Jun. 22, 2005

(65) Prior Publication Data

US 2006/0293966 A1    Dec. 28, 2006

(51) Int. Cl.
*G06Q 30/00* (2006.01)
(52) U.S. Cl. .................................... 705/26.1; 705/27.1
(58) Field of Classification Search .................. 705/26, 705/27
See application file for complete search history.

(56) References Cited

U.S. PATENT DOCUMENTS

| | | | | |
|---|---|---|---|---|
| 6,216,113 | B1* | 4/2001 | Aikens et al. | 705/34 |
| 7,430,605 | B2* | 9/2008 | Quach et al. | 709/229 |
| 7,756,749 | B2* | 7/2010 | Simpson et al. | 705/26.35 |
| 2002/0078149 | A1* | 6/2002 | Chang et al. | 709/203 |
| 2002/0147658 | A1* | 10/2002 | Kwan | 705/26 |
| 2003/0055735 | A1* | 3/2003 | Cameron et al. | 705/26 |
| 2006/0017982 | A1* | 1/2006 | Gaebel et al. | 358/400 |

FOREIGN PATENT DOCUMENTS

EP        1 056 030 A2 * 11/2000

OTHER PUBLICATIONS

Business Wire: "Ricoh Corporation Introduces Web SmartMonitor . . . ," May 29, 2003; Dialog file 610 #00908692, 2pgs.*

* cited by examiner

*Primary Examiner* — Robert M. Pond
(74) *Attorney, Agent, or Firm* — Luis M. Ortiz; Kermit D. Lopez; Ortiz & Lopez, PLLC

(57) ABSTRACT

Use of wireless technology to enable Point of Sale (POS) vending for Multi-Function Devices (MFDs) is disclosed. A user can enable the MFD through the Internet by calling or accessing a centralized server. The user can access a previously existing account or establish a new account. Also, one time use of the MFD can be enabled by entering credit or debit card information. Previously existing accounts can be recognized by the caller's phone number or other mechanism. Individual MFDs can be recognized by Global Positioning System (GPS), an access number, or by entering the MFD identification number. The server can transfer billing information, MFD or account restrictions, and available balance to the user. The MFD prevents users from overdrawing their account or from running prohibited jobs. Charges incurred are transmitted back to the server for account maintenance.

20 Claims, 2 Drawing Sheets

USING MOBILE PHONES TO PROVIDE ACCESS CONTROL AND USAGE FEE CHARGES FOR MFDS

TECHNICAL FIELD

Embodiments are generally related to Point of Sale (POS) vending applications for Multi-Function Devices (MFD), virtual vend systems, and related methods. Embodiments are further related to access mechanisms, including wireless devices such as mobile/cellular telephones. Embodiments are additionally related to Interactive Voice Response Systems (IVRS) and remote vend application servers.

BACKGROUND

Point of Sale (POS) terminals, such as vend card devices, are currently used in industry and the higher education market to control access to copiers and Multi-Function Devices (MFDs) and to charge customers for their usage. Access can be limited due to which devices recognize a user's account and how easy it is to get or renew accounts. These vend devices are expensive to purchase and have a high overhead to administer and maintain. Consequently, these devices tend to be available in limited locations (e.g., campus library, corporate headquarters) even though other MFDs may be available closer to the potential users.

Furthermore, even when MFDs are available, some of these systems do not readily support non-standard or ad-hoc usage of the system (e.g., usage by non-students, or individuals who have not yet setup an account). Alternatives that make it economically feasible to provide access to a larger population of MFDs and better support ad-hoc usage are desired.

SUMMARY

According to features of the embodiments illustrated herein, there is provided a software-based virtual vend station comprising an access mechanism, a virtual vend enabled Multi-Function Device (MFD), and a remote vend application server operatively connecting said access mechanism to said MFD.

According to another feature, access mechanisms can be provided in the form of wireless communications devices such as mobile phones, and the like.

In accordance with another feature, there is provided a virtual vend system comprising an access mechanism, a virtual vend enabled Multi-Function Device (MFD), and a remote vend application server operatively connecting said access mechanism to said MFD which utilizes Hyper-Text Transfer Protocol Secure (HTTPS).

Other disclosed features of the embodiments include a method of employing a software-based virtual vend station comprising operatively connecting a Multi-Function Device (MFD) and an access mechanism via a remote vend application server, and enabling said MFD to perform a desired job as requested by a user's inputs via said access mechanism.

DETAILED DESCRIPTION

The particular values and configurations discussed in these non-limiting examples can be varied and are cited merely to illustrate at least one embodiment of the present invention and are not intended to limit the scope of the invention.

The proposed innovation is a virtual vend station for Multi-Function Devices (MFDs). It uses a cellular telephone (or other wireless devices) as the access mechanism and a remote server as the vending device. Since there is no additional hardware required to enable the vend service on a MFD, virtually any device with a network connection can be enabled. The following sections describe the envisioned usage model and main component pieces of the system.

Figure 1:
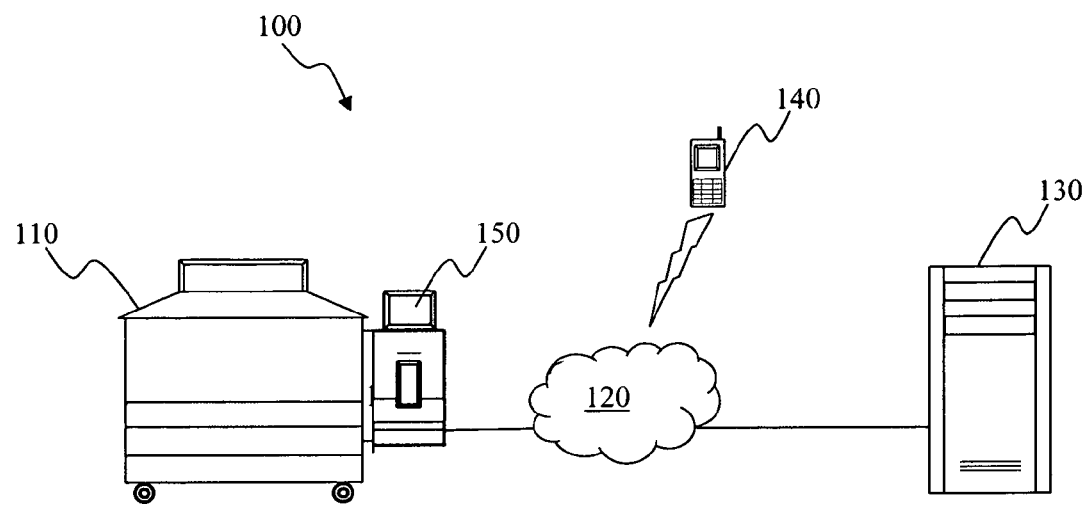
FIG. 1 illustrates a virtual vend station comprising an access mechanism, a virtual vend enabled Multi-Function Device (MFD), and a remote vend application server operatively connecting the access mechanism to the MFD in accordance with an embodiment.

Referring to FIG. 1, a virtual vend architecture 100 is illustrated that includes an access mechanism 140, a virtual vend enabled Multi-Function Device (MFD) 110, and a remote vend application server 130 operatively connecting 120 the access mechanism 140 to the MFD 110 in accordance with an embodiment is shown. The operative connection 120 can be provided in the form of any combination of wired and wireless data communications networks and standards known in the data and voice communications arts.

Signage 150 located on the MFD 110 provides users with instructions on how to use the vending service and the telephone number to call. Upon calling the specified telephone number, an Interactive Voice Response System (IVRS) allows the user to access a previously existing account, establish a new account, or enable one-time usage of the MFD 110 by entering a credit card number or opting to charge the service to his/her cellular telephone account. Previously existing accounts are automatically recognized by the system through the caller's cellular telephone number.

The MFD supports a software option that the administrator can enable to allow vending controlled access to the device. This feature can be enabled in conjunction with other accounting options such as internal auditing or job-based accounting to allow selected users to access the machine without going through the vending mechanism. It can also be enabled in addition to Foreign Device Interface (FDI) access devices (e.g., vending cards) to provide alternative control mechanisms. When enabled with any of these other accounting options, their usage models would not change.

When vending control is enabled, the user can be prohibited from initiating jobs on the MFD. Walk-up users can be denied access to the job programming pathways on the MFD. Remote users can be restricted from submitting print jobs directly to the device via an Internet Protocol (IP) restrict mechanism. Special print queues can be setup by the system administrator for submission to vending control devices. When the user submits a print job to a vending controlled device, the user can provide an account identification number or the telephone number of the telephone the user plans to use when enabling the device. Print jobs submitted in this fashion can be accessible from any vending controlled device.

Once the account and MFD are properly identified, the vend server can communicate to the MFD via Hyper-Text Transfer Protocol Secure (HTTPS) to enable the device, transmit charge plan information, specify the available account balance, specify any job restrictions, download any user profile information, and enumerate any print jobs that are queued for the user. The MFD can then allow the user to process jobs as long as there are sufficient funds in their account. Print jobs submitted by the user can be displayed in the device's print queue and can be released by the user. If a print job is released by the user, the MFD requests the vend server to submit the job to the device for printing. When the user logs out of the session, the MFD transmits the usage charges to the vend server and closes access to the job programming pathway.

A virtual vend enabled MFD has the following capabilities to enable this function:

Ability to be configured for virtual vend enablement and thereby lockout user access to the job programming pathways when the device is not enabled.

Ability to limit print job submissions to come from specified IP addresses (e.g., IP restrict).

Ability to host a website that would accept HTTPS communications from the vend server and process the communications received from that server. This includes caching user profile information and print job information, and enabling the device for usage.

Ability to implement the user profile information provided by the vend server. This might include: removing access to services restricted by the profile (e.g., email, fax), removing access to features restricted by the profile (e.g., color copying), reconfiguring device defaults based on the profile (e.g., filing repositories, email "From" addresses, dial directories), and reconfiguring the Page Description Language (PDL) interpreters to image in black & white if color printing is restricted.

Ability to dynamically compute job charges based on a charge model specified by the vend server and track those charges as they are accrued. Also provide appropriate user interface dialogs when insufficient funds are available to process a particular job.

Ability to display on the local user interface the list of print jobs submitted by the user and process user requests for their release.

Ability to communicate with the vend server via HTTPS to submit selected user print jobs back to the MFD and to transmit final usage charges upon logout by the user.

a. The vending application server can perform the following functions:

Interactive Voice Recognition System (IVRS)—This system can automatically answer calls from users needing to activate a specific MFD. The system can verify that the caller has a valid user account based on their telephone number (or allow them to setup an account) and identify the MFD that they wished to activate. The system can activate the specified machine, provide account and charge plan information, and provide a list of any queued print jobs for the user to the device via HTTPS. The system can also allow the user to check the status of their account, add funds to their account, or establish a new account.

Host Vending website—The website can allow the user to establish a new account, add funds to an existing account, or check the balance of an existing account. It can also allow the user to define security functions and MFD user interface customizations as previously discussed.

Print Server—The print server can spool jobs that are destined for a vend controlled MFD and hold them until released by the authorized user. Jobs can be automatically purged by the system after a system administrator specified time period.

Relational Database Management System (RDBMS)—The RDBMS can manage accounts, log account activity, and provide database services to the other components.

Figure 2:
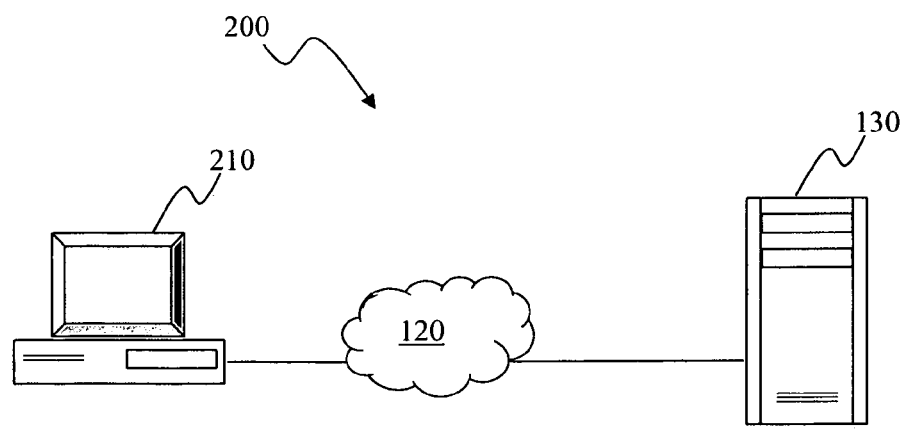
FIG. 2 illustrates the user's option to establish an account through an Internet website in accordance with an embodiment.

Referring to FIG. 2, a user's option to use a website hosting system 210 to establish an account in accordance with an embodiment is illustrated. This embodiment provides a means of establishing an account other than through the IVRS. An Internet website 210 is operatively connected 120 to the centralized server 130. As described above, operable connections 120 can be provided in the form of data network communications system and solutions known in the art. Establishing an account in this manner can provide the user the option of specifying additional security options and a means to customize the user experience at the MFD. Security options that the user can choose to define include: an optional password prompt either through the IVRS or at the local user interface of the device, job limits in terms of the number of pages that can be produced or in funding terms, and job restrictions in terms of the types of jobs that can be run (e.g., color) or the services used (e.g., email, fax). Customizations that the user can define include: specifying the "From:" e-mail address for scan-to-email jobs, specifying scan repository locations and their associated login information for scan-to-file operations, and specifying dial directories for fax destinations.

Figure 3:
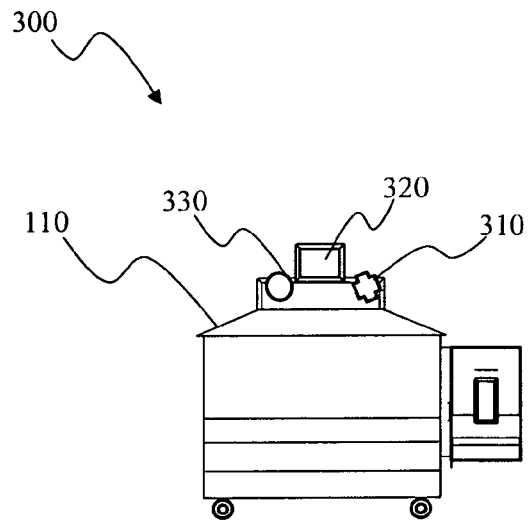
FIG. 3 illustrates the user's option in enabling the MFD with a login screen, thumbprint reader, or voice recognition device located on the MFD in accordance with an embodiment.

Identification of the particular machine that should be enabled can be achieved either through the telephone number that the user called (e.g., each MFD having a unique telephone number), Global Positioning System (GPS) (e.g., if user's access device was GPS-enabled), or by the user. Although a cellular telephone can be used as the access device in FIG. 1, other mechanisms can be used as well. Referring to FIG. 3, a depiction 300 illustrating the user's option in enabling the MFD 110 with a login screen 320, thumbprint reader 310, or voice recognition device 330 located on the MFD 110 in accordance with another embodiment is shown. The MFD 110 can be configured to contact the appropriate vend application server to validate the login, obtain account information, and complete the transaction as previously described. Rather than preauthorizing a specified amount during the initial activation procedure and then initiating the final charge at the end of the session, the MFD 110 can authorize charges and/or initiate charges on a per job basis or a per page basis as well.

Figure 4:
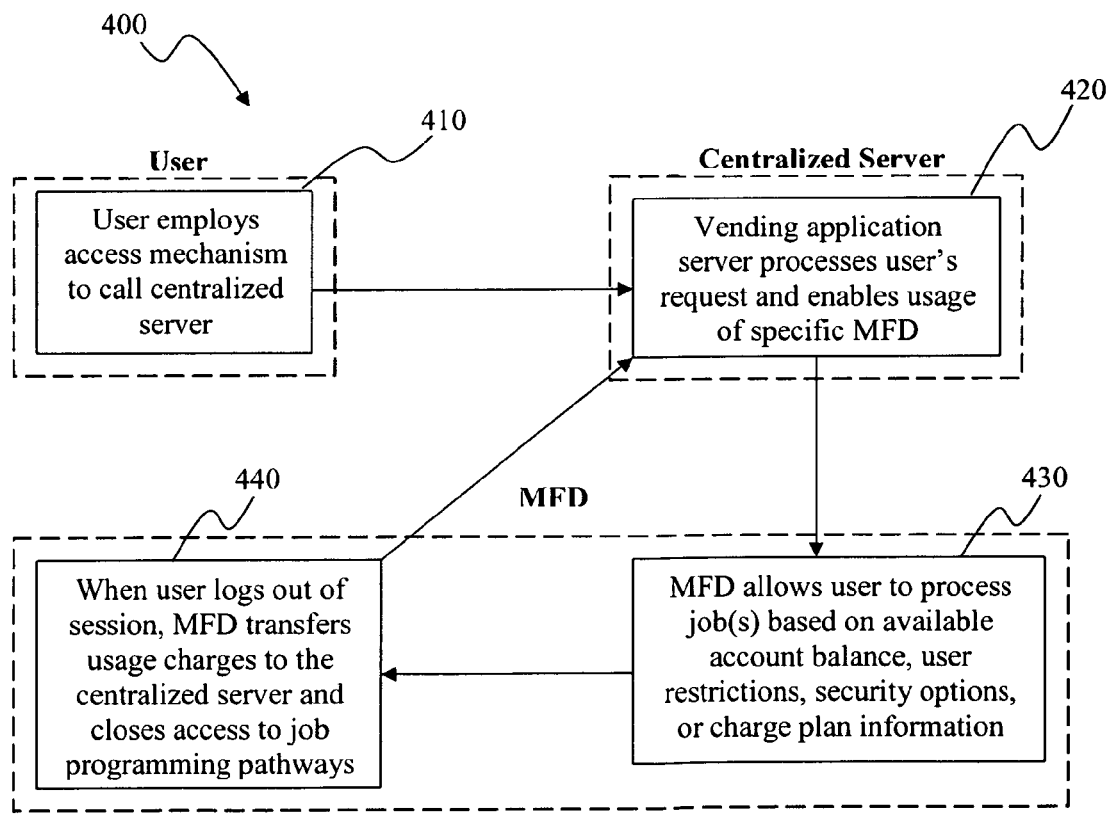
FIG. 4 depicts a diagram illustrating the control flow process employed between the user, centralized server, and MFD for a typical job in accordance with an embodiment.

Referring to FIG. 4, a diagram 400 illustrating the control flow process employed between the user, centralized server, and MFD for a typical job in accordance with an embodiment is shown. The user first employs the preferred access mechanism (e.g., cellular telephone, wireless device, local MFD user interface) to establish contact with the centralized server as shown in block 410. Then, the vending application server processes the user's request and enables the usage of the specified MFD as shown in block 420. Once enabled, the MFD allows the user to process job(s) based on the available account balance, any particular user restrictions, security options, or charge plan information as shown in block 430. Finally, when the user logs out of his/her session, the MFD transfers any usage charges to the centralized server 420 and closes access to the job programming pathways as shown in block 440.

It will be appreciated that variations of the above disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The embodiments of the invention in which an exclusive property or right is claimed are defined as follows. Having thus described the invention what is claimed is:

1. A virtual vend apparatus comprising:
an access mechanism;
a multi-function device configured to support a virtual vending controlled access option wherein said virtual vending controlled access option is an administrator selectable option on said multi-function device; and
a remote vend application server operatively connecting said access mechanism to said multi-function device wherein said virtual vending controlled access option is selected to configure said multi-function device to lock-out a user access until the user's profile information is provided by said remote vend application server and wherein said remote vend application server is adapted to hold jobs destined for said multi-function device until authorized and purge jobs from said remote vend application server after a specified time, wherein said multi-function device performs a desired print job as requested by the user's inputs via said access mechanism upon authorization by said remote vend application server and transmits usage charges from said multi-function device to said remote vend application server.

2. The virtual vend apparatus of claim 1, wherein said access mechanism is a wireless device and wherein said virtual vending controlled access option is adapted to implement a user profile information provided by said remote vend application server.

3. The virtual vend apparatus of claim 1, wherein said access mechanism is a local user interface of said multi-function device, and includes at least one of an interactive login screen, thumb print reader, voice recognition mechanism and wherein said local user interface is adapted to display a list of jobs submitted by a user.

4. The virtual vend apparatus of claim 1, wherein said remote vend application server uses hyper-text transfer protocol secure to enable said multi-function device to perform a desired print job as requested by a user's inputs via said access mechanism.

5. The virtual vend apparatus of claim 1, wherein said access mechanism is a wireless device and wherein said wireless device is used to call a specified telephone number to reach an interactive voice response system which is adapted to allow a user to access a previously existing account, establish a new account, or enable one-time usage of said multi-function device utilizing a credit card.

6. The virtual vend apparatus of claim 5, wherein said multi-function device is identified and subsequently enabled via a unique telephone number.

7. The virtual vend apparatus of claim 5, wherein said multi-function device is identified and subsequently enabled via a user's global positioning system enabled wireless device.

8. The virtual vend apparatus of claim 5, wherein said multi-function device is identified and subsequently enabled via a user entering a multi-function device identification code through said wireless device or via a voice prompt.

9. The virtual vend apparatus of claim 1, further comprising:
a host vending Internet website, wherein a user is enabled to log into said host vending Internet website, operatively connected to said remote vend application server and wherein said user is enabled to establish a new account, specify additional security options and customize the user experience at said multi-function device.

10. The virtual vend apparatus of claim 1, wherein said remote vend application server includes a relational database management system which serves to manage accounts and provide additional database services.

11. A virtual vend system comprising:
an access mechanism;
a multi-function device configured to support a virtual vending controlled access option wherein said virtual vending controlled access option is an administrator selectable option on said multi-function device; and
a remote vend application server operatively connecting said access mechanism to said multi-function device wherein said virtual vending controlled access option is selected to configure said multi-function device to lock-out a user access until the user's profile information is provided by said remote vend application server which utilizes hyper text transfer protocol secure wherein said remote vend application server is adapted to spool print jobs destined for said multi-function device and wherein said remote vend application server is adapted to hold jobs destined for said multi-function device until authorized and purge jobs from said remote vend application server after a specified time, wherein said multi-function device performs a desired print job as requested by the user's inputs via said access mechanism upon authorization by said remote vend application server and transmits usage charges from said multi-function device to said remote vend application server.

12. The virtual vend system of claim 11, wherein said access mechanism is a wireless device and wherein said wireless device is used to call a specified telephone number to reach an interactive voice response system which is adapted to allow a user to access a previously existing account, establish a new account, or enable one-time usage of said multi-function device utilizing a credit card.

13. The virtual vend system of claim 11, wherein said access mechanism is a local user interface, operatively connected to said multi-function device, including at least one of an interactive login screen, thumb print reader, voice recognition mechanism.

14. The virtual vend system of claim 11, wherein said multi-function device is identified and subsequently enabled via a unique telephone number.

15. The virtual vend system of claim 11, wherein a user logs into an Internet website, operatively connected to said remote vend application server and wherein said user specifies additional security options and customizes the user experience at said multi-function device and wherein said remote vend application server includes a relational database management system, which serves to manage accounts and provide additional database services.

16. A method of employing a software-based virtual vend station comprising:
connecting a multi-function device to a virtual vending controlled access option and an access mechanism via a remote vend application server;
selecting by an administrator said virtual vending controlled access option on said multi-function device wherein said selecting of said virtual vending controlled access option locks out user access until user profile information is provided by said remote vend application server and wherein said remote vend application server spools print jobs destined for said multi-function device and wherein said remote vend application server holds jobs destined for said multi-function device until authorized and purges jobs from said remote vend application server after a specified time;

performing by said multi-function device a desired print job as requested by the user's inputs via said access mechanism upon authorization by said remote vend application server; and transmitting usage charges from said multi-function device to said remote vend application server.

17. The method of claim 16 wherein said access mechanism is a wireless device and wherein said wireless device is used to call a specified telephone number to reach an interactive voice response system which allows a user to access a previously existing account, establish a new account, or enable one-time usage of said multi-function device utilizing a credit card.

18. The method of claim 16 wherein said access mechanism is a local user interface of said multi-function device, including at least one of an interactive login screen, thumb print reader, voice recognition mechanism.

19. The method of claim 16 further comprising:

connecting a foreign device interface to said multi-function device and wherein said multi-function device is identified and subsequently enabled via a unique telephone number.

20. The method of claim 16 further comprising:

connecting an Internet website to said remote vend application server for a user to log into said Internet website and specifying additional security options and customizing the user experience at said multi-function device and wherein said remote vend application server includes a relational database management system which manages accounts and provides additional database services.

* * * * *